United States Patent Office 3,476,792
Patented Nov. 4, 1969

3,476,792
PRODUCTION OF HEXACHLORO-
CYCLOPENTADIENE
Siegfried E. Penner and Alvis L. Malone III, Wichita,
Kans., assignors to Frontier Chemical Company, Division of Vulcan Materials Company, Wichita, Kans.,
a corporation of New Jersey
No Drawing. Continuation of application Ser. No.
496,715, Oct. 15, 1965. This application Jan. 5,
1968, Ser. No. 696,086
Int. Cl. C07c 23/08, 23/00, 17/10
U.S. Cl. 260—648                                17 Claims

ABSTRACT OF THE DISCLOSURE

A process for making hexachlorocyclopentadiene by chlorination of a $C_5$ hydrocarbon at a temperature between about 315° and 450° C. in an essentially adiabatic reaction chamber which is packed with a particulate surface active material, the temperature of reaction being maintained within the desired range by feeding an appropriate amount of an inert diluent such as carbon tetrachloride into the reaction zone in liquid form such that the heat of reaction is absorbed by the vaporization and heating up of the diluent in the process.

---

This invention relates to the production of hexachlorocyclopentadiene in a single step by reaction of chlorine with a $C_5$ hydrocarbon such as pentane, using an essentially inert normally liquid diluent and a solid contact material to moderate and control the reaction. More particularly, the invention relates to a one-step process for the production of hexachlorocyclopentadiene wherein the hydrocarbon and chlorine reactants are fed to the reaction zone in substantially theoretical amounts or only a moderate excess of chlorine is supplied, and wherein high conversion of the reactants and a hexachlorocyclopentadiene and octachlorocyclopentene yield in excess of 89%, and preferably in excess of 97%, are obtained.

Because of the increasing uses for hexachlorocyclopentadiene in the manufacture of pesticides, polymeric resins and plasticizers the demand for hexachlorocyclopentadiene has been steadily increasing. Currently it is being manufactured mainly by two different processes, both of which require a sequence of several reaction stages. Thus, in the process described in U.S. Patent No. 3,073,869, cyclopentadiene and chlorine are initially reacted in liquid phase in stages to combine first about 4 and then about 6 chlorine atoms per mole of cyclopentadiene. Finally, the resulting intermediate chlorinated product is heated in vapor phase at a temperature above 400° C. in the presence of additional chlorine to produce hexachlorocyclopentadiene by dehydrogenation of hexachlorocyclopentane to hexachlorocyclopentadiene in the presence of chlorine while minimizing side reactions. While this process gives hexachlorocyclopentadiene product in good yield it suffers from the fact that cyclopentadiene is relatively expensive and often limited in supply, that a large excess of chlorine is required in each of the three process stages, and that multistage operation of the process requires a relatively complicated plant and a costly operation.

In the other known commercial process for the production of hexachlorocyclopentadiene normal pentane is first photochemically chlorinated in liquid phase to make polychloropentane whereupon the resulting polychloropentane is converted in one or two vapor stages at high temperature to produce a mixture of hexachlorocyclopentadiene and octachlorocyclopentene. Finally, the latter is cracked to hexachlorocyclopentadiene in an externally heated stage. This process is described in U.S. Patents Nos. 2,-509,160; 2,650,942 and 2,742,506. It, however, also represents a rather complex operation, requires in practice a large excess of chlorine in the chlorination stages and results in a relatively impure hexahydrocyclopentadiene product which requires further purification for most uses.

It has also been heretofore proposed to make hexachlorocyclopentadiene from a hydrocarbon feed in a one-step process, but for one reason or another these have not proved commercially attractive. For instance, while some of these processes appeared to be quite promising in the laboratory, when attempts were made to scale them up to commercial size the prior art soon became aware that such one-step chlorination processes presented a very substantial explosion hazard as well as a problem of runaway temperatures unless special reaction conditions were employed and most carefully maintained, at the cost of substantial attendant disadvantages. Thus, the use of a very large excess of chlorine in the reaction such as 60 moles of chlorine per mole of pentane, as described in U.S. Patents Nos. 2,509,160 and 2,795,622, has heretofore been proposed to minimize the risk of explosion and act as a diluent to take heat away. This, however, has resulted in relatively low production capacity per unit reactor volume, a difficult recycle problem and has also led to relatively low product yields due to chlorinolysis side reactions, i.e., rupture of carbon-to-carbon bonds by chlorine.

It is an object of the present invention to provide an improved process for making hexachlorocyclopentadiene, $C_5Cl_6$, hereafter sometimes designated as "HCPD." A more specific object is to provide a process wherein a hydrocarbon feed is chlorinated to give HCPD in one step, characterized by high conversion of the two principal reactants and by high product yields and little formation of unwanted by-products. These and other objects as well as the nature, scope and suitable modes of operation will become more clearly apparent from the following description and appended claims. It should be understood that in this description all amounts and proportions of materials are expressed on a weight basis unless otherwise indicated.

The present invention is particularly effective for the direct chlorination of normal pentane but can likewise be practiced using as the feed other $C_5$ hydrocarbons having no carbon atom bonded directly to more than three carbon atoms, e.g., isopentene, pentene, isoprene, cyclopentane, cyclopentene, or cyclopentadiene as the feed.

When using a $C_5H_{12}$ hydrocarbon feed the chlorination reaction of the present process theoretically requires 9 moles of chlorine per mole of hydrocarbon feed; when a $C_5H_{10}$ hydrocarbon is used as feed 8 moles of chlorine per mole of hydrocarbon feed are required; when a $C_5H_8$ feed is used 7 moles of chlorine per mole of hydrocarbon are required, and when cyclopentadiene ($C_5H_6$) is used as feed 6 moles of chlorine are theoretically required per mole of hydrocarbon feed. Depending somewhat on the severity of the reaction temperature employed, in actual practice of the present process between about 90% and 125% or as much as 150% of the theoretical amount of chlorine required to convert the particular feed completely to hexachlorocyclopentadiene may be used in the present invention. The use of 0 to 15%, and particularly 3% to 10%, excess chlorine over theory represents an especially desirable operation. Generally, it is useful to employ a larger excess of chlorine when other reaction conditions are relatively mild, and vice versa.

The one-step chlorination reaction is conducted within the temperature range between about 315° and 455° C., preferably between 375° to 400° C. In addition to the two principal reactants a normally liquid diluent that is essentially inert in the reaction, e.g., a normally liquid perchlorinated hydrocarbon which does not adversely affect the desired chlorination reaction and which vaporizes in the reaction zone is also fed in the liquid state to the process in an amount appropriate to maintain the reaction temperature at the desired level. For instance, about 10 to 45 parts of the diluent per part of hydrocarbon feed can be used, the optimum proportion depending on the hydrocarbon being chlorinated and the heat of vaporization and the heat capacity of the diluent employed. Liquid carbon tetrachloride, used for instance in a proportion of from about 15 to 45 parts per part of hydrocarbon feed, represents a particularly advantageous diluent in the present process but other inert liquid diluents such as perchloroethylene, hexachlorobutadiene, hexachlorocyclopentadiene, etc. may be used likewise.

In addition to using an extraneous diluent or recycling some HCPD product to the reaction to serve as a diluent therein, it is particularly advantageous to recycle to the reaction the by-product octachlorocyclopentene ("OCP") which is formed in the process and which upon recycling is substantially completely converted to HCPD according to the equation $C_5Cl_8 \rightarrow C_5Cl_6 + Cl_2$. When practicing such recycle it should be remembered that one mole of OCP recycle is substantially equivalent to supplying one mole of free chlorine to the reaction and this should be taken into account when determining the total amount of chlorine supplied to the reaction.

The reaction is conveniently conducted in an elongated, tubular reactor which has all or at least a major portion of its length filled or packed with a particulate surface active solid contact material. Under otherwise comparable conditions, a completely packed reactor generally tends to give substantially better product yields than a partially packed reactor. Substantial chlorinolysis may tend to take place in an unobstructed reaction zone, especially when vigorous reaction conditions, e.g., high temperature and/or a high chlorine-to-hydrocarbon ratio, are employed. Nevertheless, the use of an only partially packed reactor is often advantageous, provided that the unobstructed or void reaction zone precedes the packed zone. For instance, good results can be obtained with a reactor wherein the fore portion, e.g., the first third of its length, is unobstructed and the packing is disposed in the hind portion, i.e., latter two thirds, of its length. In such an arrangement, the void fore portion can be beneficial in facilitating the distribution and mixing of reactants. However, to avoid substantial chlorinolysis such unobstructed pre-mixing zone must be small enough so that the reactants spend in it only a short time, e.g., a superficial residence time of less than 10 seconds and preferably less than 5 seconds, and are quickly swept into the packed section of the reactor where chlorinolysis is inhibited and the desired cyclization is facilitated. The reactor is constructed of a corrosion resistant metal such as Monel, nickel, or Inconel, preferably with a graphite lining. The presence of iron in the reaction zone is undesirable. Using a reactor packed with a solid contact material, good results are obtained by maintaining the reaction mixture in the reaction zone in vapor phase for a superficial residence time of between about 1 and 60 seconds, preferably 5 and 25 seconds.

Diatomaceous silica in pellet form (Celite–408) was found to be a particularly effective contact material. However, almost all other solid particulate contact materials, porous or non-porous, such as graphite, silica gel (e.g., Davison Grade 59), tabular alumina (e.g., Alcoa T–61), and even glass beads, also give the desired surface effect in promoting HCPD formation by increasing the cyclization rate relative to the chlorinolysis rate. Such contact material may be impregnated with an auxiliary catalyst such as cobalt chloride or nickel chloride but the incremental affect of such auxiliary catalyst is usually small and the inclusion of such auxiliary catalyst is therefore unnecessary. The only solids which are not suitable for use as contact materials are those few which tend to catalyze unwanted side reactions such as decomposition or polymerization. More particularly, only activated alumina, activated carbon and molecular sieves have been found unsatisfactory. The suitability of any particular contact material for use in the present invention can of course be readily determined in a preliminary trial run.

In a packed-reactor process conducted in accordance with this invention the HCPD plus OCP should account for over 85 mole percent, and under preferred conditions for over 95 mole percent, of the product on a diluent-free basis. By contrast, when using an empty or unobstructed tube as the reactor the HCPD plus OCP generally accounts for less than 75 mole percent of the product with chlorinolysis products as the main by-products.

Within the ranges of reaction conditions recited, relatively short residence times are preferred when the reaction temperature is near the upper end of the disclosed temperature range whereas longer residence times are preferred when the reaction temperature is in the lower portion of the disclosed temperature range. When the combination of reaction conditions used is milder than optimum the formation of products other than HCPD and OCP tends to increase due to only partial chlorination. Conversely, when the combination of reaction conditions used is more vigorous than optimum, by-product formation tends to increase due to excessive chloroinolysis.

Test runs illustrating the effectiveness of the present process were made using a nickel tube reactor (1.5" internal diameter, 18" long) placed vertically in an insulated electric furnace. This reactor was provided with a feed nozzle at the top and a products outlet at the bottom and a glass covered thermocouple well extending throughout the entire length of the reactor. The reactor was equipped with a graphite lining. The internal volume of the reactor was approximately 500 milliliters. The reactor was heated to the desired temperature and liquid feed was then started, followed by chlorine gas feed. Upon shutdown, the chlorine was turned off first, a small nitrogen purge was started, then liquid feed was turned off. The amount of carbon tetrachloride or other diluent pre-mixed with the pentane or other reactant to form the liquid feed was such that reactor temperatures did not change greatly with time. In essence, this arrangement simulated a commercial-scale, adiabatic reactor. After a run had reached equilibrium, usually after one or two hours, a substantial quantitative test lasting 30 to 180 minutes was conducted. During such a test period liquid feed was supplied from a special small reservoir containing a known weight of the $C_5$ hydrocarbon plus diluent mixture. Temperatures were read at one-half inch intervals along the thermocouple well and products were collected in two tared receivers, the first of which contained a known amount of water and the second a known quantity of 10% caustic solution.

At the end of the test period the liquid feed was switched back to the line-out feed reservoir and the product stream to another set of receivers. The test period liquid feed reservoir was drained and the amount of feed mixture remaining was substracted from the original weight to determine the weight of hydrocarbon plus diluent fed during the test period. Chlorine feed was determined from a calibrated rotameter curve. The two receivers were weighed, a mass balance independent of any analyses was calculated from the gain in weight and the total weight of the chlorine plus hydrocarbon plus diluent charged. The organic layer and the aqueous layer in the first receiver were separated. The organic layer was weighed and the weight of the aqueous layer determined by difference. Chlorine in the organic layer was determined using a standard KI-thiosulfate titration. A portion of the organic layer was washed with dilute sodium bicarbonate solution followed by water, and dried over anhydrous calcium sulfate. This washed organic solution was finally analyzed by gas chromatography. Chlorine in the water layer was analyzed by the standard KI-thiosulfate method. Following the chlorine determination, the same aliquot was titrated for hydrogen chloride with standard base using bromothymol blue indicator. The caustic solution in the second receiver was analyzed for chlorine by the same standard procedure as was used for the above solutions.

The data shown in Table I illustrate the advantage of a packed reactor over an unpacked one, as well as the importance of having the hind portion of the reactor packed when an incompletely packed reactor is used.

More specifically, Run No. 4, employing a reactor fully packed with ⅛ inch pellets of calcined diatomaceous silica ("Celite–408") can be seen in Table I to have given the best results in terms of high hydrocarbon and chlorine conversions as well as a combined yield of HCPD plus OCP of almost 98%. Run No. 3 wherein the bottom two-thirds of the reactor were packed with diatomaceous silica and the top third was unobstructed, also gave very good hydrocarbon and chlorine conversions and an HCPD yield in excess of 90%, but relatively little OCP was produced and by-products such as perchloroethylene, hexachloroethane and hexachlorobenzene were formed at an increased rate.

Run No. 1 employing an unobstructed reactor gave the poorest results in that the least amount of HCPD plus OCP was formed together with the most chlorinolysis products. It required the highest temperature for reaction. Run No. 2 wherein the reactor contained unobstructed sections of substantial length before and after an intermediate section packed with diatomaceous silica gave results intermediaate between those of Runs No. 1 and No. 3. The large amount of OCP compared to HCPD in this run was caused by the large excess of chlorine in the feed. These runs show that the presence of a packing significantly changes the severity of conditions required for the perchlorination and significantly changes the product distribution.

The extruded, ⅛-inch pellets of diatomaceous silica used in this work had the following specifications: ignition loss, 0.2%; skeletal density, 2.3 g./cc.; tamped bulk density, 0.54 g./cc.; macropore volume (diameter greater than 5 microns), 0.56; surface area, 3–10 m.$^2$/g.; temperature resistance, 1150° C.; water absorption, 60 g./100 g., average. The uncalcined diatomaceous silica powder has approximately the following composition: weight percent dry basis: $SiO_2$, 89.7; $Al_2O_3$, 3.7; $Fe_2O_3$, 1.5; $TiO_2$, 0.1; CaO, 0.4; MgO, 0.7; alkalies as $Na_2O$, 0.8; ignition loss (combined $H_2O$, $CO_2$ and organics), 3.7.

The applicability of the present process to the production of HCPD from $C_5$ hydrocarbons other than n-pentane is illustrated by Run No. 5 wherein isopentane was used as feed. Table II summarizes the data from this run and compares them with data from Run No. 6 wherein n-pentane feed was used under comparable conditions. The same reactor, fully packed with the diatomaceous silica pellets, was used in these two runs as in previously described Run No. 4. Each test run lasted 30 minutes.

TABLE I.—EFFECT OF PACKING

|  | No Packing | Partial Packing | | Full Packing |
|---|---|---|---|---|
|  |  | Intermediate | Terminal |  |
|  | Run No. | | | |
|  | 1 | 2 | 3 | 4 |
| Contact Mass | None | Diatomaceous Silica Pellets | | |
| Height of Empty Reactor above Bed, in |  | 4 | 6 | 0 |
| Bed Depth, in | 0 | 4 | 12 | 18 |
| Height of Empty Reactor below Bed, in |  | 10 | 0 | 0 |
| Operating Conditions: |  |  |  |  |
| Avg. Bed Temp., ° C |  | 367 | 396 | 370 |
| Avg. Reactor Temp., ° C | 409 | 372 | 377 | 370 |
| Max. Reactor Temp., ° C | 435 | 411 | 404 | 383 |
| Superficial Residence Time, sec | 19 | 23.6 | 10.4 | 10.8 |
| Length of Test Period, min | 41 | 60 | 30 | 60 |
| Feed Rates: |  |  |  |  |
| Pentane, g. moles/hr | .0635 | .0568 | .122 | .129 |
| Chlorine, g. moles/hr | .81 | .811 | 1.13 | 1.21 |
| Percent Excess, HCPD basis | 43 | 59 | 3.1 | ʃ4.2 |
| $CCl_4$, g. moles/hr | .628 | .566 | 1.76 | 1.86 |
| Mole Ratio $CCl_4$/Pentane | 10 | 10 | 14.5 | 14.4 |
| OCP, g. moles/hr | None | None | None | .0148 |
| Mole Ratio OCP/Pentane |  |  |  | .072 |
| Material Balance, Percent, Total Mass | 80.2 | 94.2 | 92.6 | 99.0 |
| Conversions, Percent: |  |  |  |  |
| Pentane, C basis | 84.1 | 93.0 | 91.2 | 90.9 |
| Pentane, H basis | 77.5 | 100 | 96.5 | 100.5 |
| Unconverted Chlorine (out basis) | 28.5 | 28 | .1 | 3.5 |
| Product Distribution, $CCl_4$, Wt. Percent | 87.1 | 81.46 | 88.92 | 88.82 |
| $CCl_4$-Free Basis, mole percent: |  |  |  |  |
| Perchloroethylene | 16.6 |  | 1.8 | .3 |
| $C_2H_2Cl_4$ | Trace | 3.4 | .3 |  |
| Hexachloroethane | 1.9 | 4.8 | 1.2 |  |
| Hexachlorobutadiene | 5.0 | .1 | .3 | Trace |
| $C_5Cl_6$ |  | 2.2 |  |  |
| HCPD | 65.5 | 10.5 | 90.6 | 89.0 |
| $C_5Cl_8$ |  |  | .7 | .2 |
| OCP | 7.8 | 78.8 | 2.1 | 8.8 |
| Hexachlorobenzene | 3.2 |  | 3.0 | 1.7 |
| Color of Product | Amber |  | Dk. Amber | Orange |

TABLE II.—COMPARISON OF DIFFERENT FEEDS

| | Run No. | |
|---|---|---|
| | 5 | 6 |
| | Feed Hydrocarbon | |
| | Isopentane | Normal Pentane |
| Operating Conditions: | | |
| Avg. Temp., °C | 367 | 371 |
| Max. Temp., °C | 396 | 394 |
| Superficial Residence Time, sec | 11.3 | 11.1 |
| Feed Rates: | | |
| $C_5H_{12}$, g. moles/hr | .121 | .123 |
| Chlorine, g. moles/hr | 1.17 | 1.17 |
| Percent Excess, HCPD basis | 7.2 | 5.9 |
| $CCl_4$, g. moles/hr | 1.76 | 1.78 |
| Wt. Percent Pentane in Pentane-$CCl_4$ Mix | 3.14 | 3.14 |
| Material Balance, Percent: | | |
| Total Mass | 99.8 | 98.3 |
| Carbon | 95.0 | 96.2 |
| Chlorine | 95.0 | 96.1 |
| Hydrogen | 95.8 | 100.3 |
| $CCl_4$ | 93.8 | 95.1 |
| Conversions, Percent: | | |
| Pentane, C basis | 98.4 | 99.4 |
| Pentane, H basis | 95.8 | 100.3 |
| Unconverted Chlorine (out basis) | 5.6 | 3.2 |
| Product Distribution, $CCl_4$, Wt. Percent | 87.86 | 88.25 |
| $CCl_4$-Free Basis, mole percent: | | |
| Perchloroethylene | .67 | .25 |
| Hexachloroethane | .33 | |
| Hexachlorobutadiene | .92 | .25 |
| HCPD | 71.21 | 85.53 |
| $C_5Cl_8$ | 4.24 | |
| OCP | 22.05 | 13.98 |
| Hexachlorobenzene | .58 | |
| Color of Product | Yellow | Pale Yellow |

It can be seen that, as in the case of n-pentane, the present process gives almost quantitative conversion of isopentane under relatively moderate conditions and that the product from isopentane contains about 94 mole percent HCPD plus OCP ($CCl_4$-free basis) versus about 99 mole percent HCPD plus OCP from n-pentane. The isopentane product contained a small amount of material that was eluted between HCPD and OCP upon analysis by gas chromatography. These intermediates may be converted to additional desired product upon recycle or use of more severe conditions.

The utility of various contact materials as catalysts in the present process is shown in Table III. In each of these runs the previously described reactor was again used, fully packed with the material indicated. Run No. 1, employing an unobstructed reactor, is also reproduced in this table for comparison. Each test again lasted 30 minutes.

The data summarized in Table III show that diatomaceous silica gives excellent results both under relatively mild conditions (Run 6) and under more severe ones (Run 7), a somewhat lighter colored product and a higher HCPD yield on a once-through basis being obtained under the milder conditions.

Impregnation of the diatomaceous silica pellets with metal salts, e.g., with copper chloride and potassium chloride (Run 8) or with nickel chloride and potassium chloride (Run 9), results in a usable but less desirable catalyst. The sum of HCPD plus OCP in Run 8 was only about 90 percent versus about 98 percent in Run 6. In Run 9 the sum of HCPD plus OCP was about the same as in Run 6, and the yield of HCPD itself was actually somewhat higher. In both Runs 8 and 9, however, the presence of compounds that were eluted on a gas chromatographic column between perchloroethylene and hexachloroethane, and between HCPD and OCP, indicates incomplete reaction. This is supported by the low figures for pentane conversion.

Run 10 shows that silica gel is also usable as a catalyst, though not as good as the diatomaceous silica. Comparison between Run 10 and Run 7, both of which were conducted under substantially similar conditions (a slightly higher temperature and a somewhat larger excess of chlorine was employed in Run 10), shows that use of silica gel results in substantially more chlorinolysis products and more hexachlorobenzene. The sum of HCPD plus OCP in the product was about 90 percent in the silica gel run versus 97 percent in the diatomaceous silica run. The silica gel catalyst was black at the end of the run.

Run 11 shows that tabular alumina, a non-porous material, also represents a catalyst which is acceptable but less desirable than diatomaceous silica. A desirably high ratio of HCPD to OCP is produced and relatively little unwanted chlorinolysis takes place but pentane conver-

TABLE III.—EFFECTIVENESS OF VARIOUS CONTACT MATERIALS

| | Run No. | | | | | | | |
|---|---|---|---|---|---|---|---|---|
| | 1 | 6 | 7 | 8 | 9 | 10 | 11 | 12 |
| d,e Catalyst | None | $SiO_2$[a] | $SiO_2$[a] | $SiO_2$[b] | $SiO_2$[c] | $SiO_2$[d] | $Al_2O_3$[e] | Graphite[f] |
| Operating Conditions: | | | | | | | | |
| Avg. Temp., °C | 409 | 371 | 380 | 366 | 370 | 392 | 370 | 384 |
| Max. Temp., °C | 435 | 394 | 407 | 382 | 387 | 417 | 404 | 399 |
| Superficial Residence Time, sec | 19 | 11.1 | 11.2 | 11.8 | 11.4 | 11.1 | 11.3 | 11.1 |
| Feed Rates: | | | | | | | | |
| Pentane, g. moles/hr | .0635 | .123 | .117 | .112 | .117 | .116 | .119 | .119 |
| Chlorine, g. moles/hr | .81 | 1.17 | 1.18 | 1.18 | 1.17 | 1.18 | 1.17 | 1.17 |
| Percent Excess, HCPD basis | 43 | 5.9 | 11.3 | 15.9 | 10.7 | 12.1 | 9.5 | 9.0 |
| $CCl_4$, g. moles/hr | .628 | 1.78 | 1.70 | 1.62 | 1.70 | 1.69 | 1.72 | 1.73 |
| Wt. Percent Pentane in Pentane—$CCl_4$ Mix | 4.5 | 3.14 | 3.14 | 3.14 | 3.14 | 3.14 | 3.14 | 3.14 |
| Material Balance, Percent: | | | | | | | | |
| Total Mass | 80.2 | 98.3 | 98.3 | 97.6 | 95.9 | 97.3 | 96.7 | 97.8 |
| Carbon | 76.5 | 96.2 | 94.5 | 93.7 | 92.3 | 90.7 | 91.5 | 93.4 |
| Chlorine | 79.0 | 96.1 | 95.9 | 94.6 | 94.0 | 93.9 | 94.7 | 95.1 |
| Hydrogen | 77.5 | 100.3 | 102.0 | 97.3 | 96.8 | 97.9 | 96.2 | 99.7 |
| $CCl_4$ | 80.2 | 95.1 | 95.6 | 98.1 | 95.0 | 94.1 | 95.4 | 96.9 |
| Conversions, Percent: | | | | | | | | |
| Pentane, C basis | 84.1 | 99.4 | 91.3 | 81.1 | 84.6 | 80.8 | 80.2 | 83.2 |
| Pentane, H basis | 77.5 | 100.3 | 101.9 | 97.3 | 96.8 | 97.9 | 96.2 | 99.7 |
| Unconverted Chlorine (out basis) | 28.5 | 3.2 | 7.3 | 3.6 | 7.2 | 9.6 | 9.0 | 2.1 |
| Product Distribution; $CCl_4$, Wt. Percent | 87.1 | 88.25 | 89.15 | 90.00[g] | 89.90 | 89.81 | 90.31[h] | 90.00 |
| $CCl^4$—Free Basis, mole percent: | | | | | | | | |
| Perchloroethylene | 16.6 | .25 | .19 | 1.08 | .20 | 4.06 | .21 | .40 |
| Hexachloroethane | 1.9 | | | 1.30 | | .31 | .21 | .10 |
| Hexachlorobutadiene | 5.0 | .25 | .19 | .11 | .20 | 1.56 | Trace | .10 |
| HCPD | 65.5 | 85.53 | 82.91 | 64.36 | 89.35 | 63.16 | 85.52 | 79.30 |
| $C_5Cl_8$ | | | | | 6.0 | .90 | 4.90 | |
| OCP | 7.8 | 13.98 | 15.41 | 25.70 | 9.35 | 26.22 | 7.40 | 19.80 |
| Hexachlorobenzene | 3.2 | | 1.31 | .11 | | 4.68 | .31 | .30 |
| Color of Product | Amber | Pale yellow | Yellow | Pale yellow | Yellow | Yellow | Amber | Yellow |

[a] "Celite-408" diatomaceous silica, ⅛" pellets.
[b] "Celite-408" impregnated with 16.6% $CuCl_2$ and 8.9% KCl, ⅛" pellets.
[c] "Celite-408" impregnated with 10.3% $NiCl_2$ and 7.5% KCl, ⅛" pellets.
[d] Silica gel, Davison Grade 59, 3 to 8 mesh.
[e] Tabular alumina, Aluminum Company of America, Grade T-61, ¼" to 8 mesh.
[f] Graphite, National Carbon Company, electric furnace graphite powder, Catalog No. GP9P9, 4 to 8 mesh.
[g] Two unidentified peaks were present in the gas chromatograph scan representing an estimated total of 1.25 mole percent.
[h] One unidentified peak was present in the gas chromatograph scan representing an estimated 1.46 mole percent.

sion is substantially lower than when diatomaceous silica is used under comparable conditions.

Graphite, another relatively non-porous catalyst, was used in Run 12. While somewhat inferior to diatomaceous silica, it also produced satisfactory results as indicated by the fact that the sum of HCPD plus OCP was about 99 percent, though the ratio of HCPD to OCP was substantially lower in this run than in Runs 6 and 7.

As a general conclusion it is significant to observe that though diatomaceous silica is best among all the catalysts tried to date, all the catalysts reported in Table II substantially prevented chlorinolysis and resulted in importantly higher yields of HCPD plus OCP than reaction in an obstructed reactor, without any catalyst (Run 1).

The effect of the several process variables on the results obtained in the present process is illustrated by the representative runs which are summarized in Table IV. This set of n-pentane chlorination runs was conducted with ratio and/or residence time (compare Runs 18 and 13). Thus, an increase in severity of one variable can be balanced within wide limits by decreasing the severity of one or more other variables. For instance, while a 50% excess chlorine was too much under the conditions of Run 18 (maximum temperature 405° C., residence time 14.7 seconds), a substantially higher excess of chlorine was found to be acceptable in a run (not reported) which was conducted at a maximum temperature of 365° C. and a residence time of 15 seconds.

The effect of OCP recycle is shown in Table V, using either $CCl_4$ (Runs 19, 20 and 21) or HCPD (Runs 22 and 23) as diluent. In this series of runs the 18-inch reactor was fully packed with the diatomaceous silica ("Celite–408," ⅛" pellets). All test periods were 30 minutes long. One catalyst charge was used without change for the $CCl_4$-diluent runs and another catalyst charge was used without change for the HCPD-diluent runs.

TABLE IV.—EFFECT OF PROCESS VARIABLES

| | Run No. | | | | | | |
|---|---|---|---|---|---|---|---|
| | 3 | 13 | 14 | 15 | 16 | 17 | 18 |
| Operating Conditions: | | | | | | | |
| Avg. Catalyst Temp., ° C | 396 | 397 | 385 | 362 | 358 | 431 | 393 |
| Avg. Reactor Temp., ° C | 377 | 385 | 373 | 342 | 343 | 400 | 382 |
| Max. Reactor Temp., ° C | 404 | 399 | 390 | 368 | 372 | 436 | 405 |
| Superficial Residence Time, sec | 10.4 | 11.1 | 19.4 | 13.9 | 10.2 | 10.4 | 14.7 |
| Feed Rates: | | | | | | | |
| Pentane, g. moles/hr | .122 | .129 | .0796 | .0886 | .148 | .123 | 0.832 |
| Chlorine, g. moles/hr | 1.13 | 1.27 | .674 | 1.14 | 1.55 | 1.23 | 1.13 |
| Percent Excess, HCPD basis | 3.1 | 9.6 | −6 | 43.2 | 16.5 | 10.6 | 50.9 |
| $CCl_4$, g. moles/hr | 1.76 | 1.28 | .795 | 1.34 | 1.48 | 1.79 | 1.08 |
| Mole Ratio $CCl_4$/Pentane | 14.5 | 10 | 10 | 15.2 | 10 | 14.5 | 12.9 |
| Material Balance, percent, Total Mass | 92.6 | 95.5 | 90.7 | 98.1 | 97.2 | 96.3 | 92.6 |
| Conversions, percent: | | | | | | | |
| Pentane, C basis | 91.2 | 72.7 | 69.5 | 91.0 | 97.8 | 80.0 | 128.6 |
| Unconverted Chlorine (out basis) | .1 | 8.9 | 4.2 | 25.0 | 4.0 | 0.9 | 14.8 |
| Product Distribution, $CCl_4$, Wt. percent | 88.92 | 87.5 | 86.6 | 87.63 | 82.16 | 90.5 | 79.28 |
| $CCl_4$-Free Basis, mole percent: | | | | | | | |
| Perchloroethylene | 1.8 | | | | Trace | 8.9 | .3 |
| $C_2H_2Cl_4$ | .3 | 1.7 | 1.1 | .6 | .6 | .3 | |
| Hexachloroethane | 1.2 | .5 | .2 | 5.0 | 1.3 | 1.5 | 15.1 |
| Hexachlorobutadiene | .3 | | | Trace | .2 | 2.0 | |
| HCPD | 90.6 | 59.6 | 70.5 | 2.2 | 22.1 | 80.7 | 1.8 |
| $C_5Cl_8$ | .7 | | | | 13.7 | | |
| OCP | 2.1 | 36.3 | 22.0 | 87.2 | 60.9 | 3.5 | 82.6 |
| Hexachlorobenzene | 3.0 | 1.9 | 6.4 | 1.9 | 1.0 | 3.0 | .1 | ducted with the same reactor and catalyst as were used in Run No. 3 (Table I), i.e., the lower two-thirds of the 18-inch long reactor were packed with ⅛-inch pellets of diatomaceous silica ("Celite–408").

The data from Runs 3, 13, 14 and 15 show that satisfactory results can be obtained under a variety of conditions, i.e., under a variety of combinations of reaction temperature, residence time and chlorine/pentane ratio. For instance, in Run 16, wherein a relatively low reaction temperature and only a moderate excess of chlorine were employed, some of the chlorination, dehydrochlorination or cyclization steps were incomplete resulting in the presence of significant amounts of intermediate product that eluted between HCPD and OCP in chromatographic analysis, thereby indicating unduly mild reaction conditions. However, increasing the maximum temperature from about 370° C. to about 400° C. (Run 13), or increasing the excess chlorine from 16.5% to about 43% (Run 15) eliminated this intermediate material and substantially increased the yield of HCPD plus OCP.

At the other extreme, when reaction temperature and/or excess of chlorine are relatively high (Runs 17 and 18), carbon to carbon rupture becomes more prevalent as reflected by the presence of perchloroethylene and hexachloroethane in the product and the yield of HCPD plus OCP suffers accordingly. This undesirable effect can be corrected, however, by reducing the temperature (compare Runs 17 and 13) or by reducing the chlorine The results in Table V show that OCP recycle had little if any effect on product distribution. The amounts of HCPD and OCP in the products of all test periods were the same except for small differences attributable to differences in chlorine content present at the end of the run. In Run 21 wherein the feed contained 0.5 mole OCP per mole of pentane, when the labile chlorine of OCP in the feed is taken into account, substantially more chlorine (8% excess) was actually fed per mole of pentane than in Run 19 (4.6% excess) or in Run 20 (5% excess). Since more was fed, more free chlorine was present at the end of Run 21 than at the end of Runs 19 and 20. This resulted in slightly more OCP being present in Run 21 than in Runs 19 and 20. Note, however, that if all the OCP fed to Run 21 had gone through unchanged while all the pentane had been converted to HCPD only, the product would have contained 32 mole percent OCP instead of the observed 5 percent. It is thus manifest that it is possible to recycle OCP to the process to obtain HCPD as the only product, except for small amounts of other by-products.

Similar conclusions are reached from the results of Runs 22 and 23 wherein HCPD was used as diluent instead of carbon tetrachloride. (In Run 23 the excess chlorine was 15%, converting the labile chlorine from OCP.) A very substantial net consumption is evidenced by the results of Run 23. If all feed OCP had gone through this run unchanged and no OCP had been made TABLE V.—EFFECT OF OCP RECYCLE AND USE OF CCl₄ OR HCPD AS DILUENTS

| | Run No. | | | | |
|---|---|---|---|---|---|
| | 19 | 20 | 21 | 22 | 23 |
| Operating Conditions: | | | | | |
| Avg. Temp., °C | 386 | 385 | 381 | 385 | 376 |
| Max. Temp., °C | 397 | 396 | 394 | 397 | 389 |
| Superficial Residence Time, sec | 10.2 | 10.0 | 9.9 | 13.8 | 14.0 |
| Feed Rates: | | | | | |
| Pentane, g. moles/hr | .131 | .133 | .134 | .128 | .133 |
| Chlorine, g. moles/hr | 1.24 | 1.24 | 1.24 | 1.24 | 1.24 |
| Percent Excess, HCPD basis | 4.6 | 3.2 | 2.4 | 7.3 | 3.2 |
| CCl₄, g. moles/hr | 1.90 | 1.93 | 1.95 | | |
| HCPD, g. moles/hr | .00 | .0021 | .0067 | 1.05 | .933 |
| OCP, g. moles/hr | None | .0203 | .0668 | None | .123 |
| Mole Ratio CCl₄/Pentane | 14.5 | 14.5 | 14.5 | | |
| Mole Ratio HCPD/Pentane | 0 | .0150 | .0498 | 8.17 | 7.0 |
| Mole Ratio OCP/Pentane | 0 | .151 | .497 | 0 | .925 |
| Wt. percent Pentane in Liquid Feed | 3.14 | 3.14 | 3.14 | 3.14 | 3.14 |
| Material Balance, percent, Total Mass | 97.0 | 97.8 | 98.6 | 99.6 | 99.2 |
| Conversions, percent: | | | | | |
| Pentane, C basis | 95.8 | 99.8 | 100.7 | 95.1 | 92.3 |
| Pentane, H basis | 96.9 | 97.8 | 96.4 | 94.0 | 97.5 |
| Unconverted Chlorine (out basis) | 2.6 | 2.4 | 5.9 | 3.8 | 4.3 |
| Product Distribution, CCl₄, Wt. percent | 88.95 | 86.96 | 83.17 | (¹) | (¹) |
| CCl₄-Free Basis, mole percent: | | | | | |
| Perchloroethylene | .32 | .13 | .62 | .09 | |
| C₂H₂Cl₄ | Trace | | .19 | | |
| Hexachloroethane | .48 | .19 | .52 | | |
| Hexachlorobutadiene | Trace | .13 | .29 | .79 | .64 |
| HCPD | 94.29 | 95.75 | 91.90 | 95.12 | 93.08 |
| C₅Cl₈ | .55 | .39 | .76 | | |
| OCP | 2.93 | 2.00 | 5.00 | 3.99 | 5.68 |
| Hexachlorobenzene | 1.43 | 1.42 | .76 | | |
| Color of Product | Orange | Pale orange | Orange | Dark yellow | Dark amber |

¹ HCPD used as diluent, not CCl₄. If any CCl₄ was formed in the reaction, it was not detectable because of dilution of product with CCl₄ prior to chromatographic analysis.

in the process, the product would have contained 10.3 mole percent OCP instead of the observed 4 percent. These two runs also show that HCPD is a satisfactory diluent for the present process though carbon tetrachloride is preferred.

All amounts and proportions of materials are given in this specification on a weight basis unless otherwise indicated.

Now that the general nature of the present invention has been described and illustrated in terms of several complete embodiments, the invention is particularly pointed out in the appended claims.

We claim:
1. A one-step process for making hexachlorocyclopentadiene by reaction of a $C_5$ hydrocarbon with chlorine which comprises:

establishing an elongataed essentially adiabatic reaction zone having an inlet end and an outlet end, said zone being heated to and maintained at a temperature within predetermined limits between about 315° and not more than about 400° C. and having a fore portion and a hind portion, at least about the hind two-thirds of said zone being packed with a solid particulate contact material and not more than the front third of said zone nearest its inlet end being unobstructed such that the residence time of the reactants in any such unobstructed portion is less than 5 seconds, said particulate material being selected from the group consisting of diatomaceous silica, silica gel, porous contact materials having a surface area of between 1 and 50 m.²/g., and nonporous contact material, introducing into said reaction zone at its inlet end
(a) at least one $C_5$ hydrocarbon in liquid form selected from the group consisting of aliphatic and cycloaliphatic hydrocarbons wherein each carbon atom is bonded to not more than three other carbon atoms; (b) free chlorine in a proportion equal to between about 90% and 150% of the theoretical amount of chlorine required to convert said hydrocarbon to hexachlorocyclopentadiene; and (c) as the means for maintaining the reaction temperature in said reaction zone within the predetermined limits, a diluent in liquid form which is a perchlorinated hydrocarbon of from 1 to 5 carbon atoms and capable of vaporizing in said reaction zone at the temperature and pressure prevailing therein, said liquid diluent being introduced in a proportion which maintains a maximum temperature of not more than 455° C. in said reaction zone, thereby forming a vapor phase reaction mixture in said fore portion of the reaction zone;

passing said reaction mixture in vapor phase through said zone at a pressure between about 0 and 50 p.s.i.g. at a rate resulting in a superficial residence time of between about 1 and 60 seconds and sufficient to result in a feed conversion of at least 85%;

withdrawing the resulting reaction product from the reaction zone at the outlet end thereof;

and separating hexachlorocyclopentadiene from the withdrawn product.

2. A process according to claim 1 wherein said $C_5$ hydrocarbon consists essentially of normal pentane.
3. A process according to claim 1 wherein said $C_5$ hydrocarbon comprises at least 75% isopentane.
4. A process according to claim 1 wherein said $C_5$ hydrocarbon is mixed with from about 3 to about 10% excess chlorine over the chlorine theoretically required to convert said hydrocarbon to hexachlorocyclopentadiene.
5. A process according to claim 4 wherein the pressure in the reaction zone is between about 0 and 25 p.s.i.g., the maximum temperature in the reaction zone is between about 375° and 400° C., and the superficial residence time of the reaction mixture in the reaction zone is between about 5 and 25 seconds.
6. A process according to claim 5 wherein the diluent is carbon tetrachloride.
7. A process according to claim 5 wherein the diluent is perchloroethylene.
8. A process according to claim 5 wherein the diluent is hexachlorocyclopentadiene.
9. A process according to claim 5 wherein the diluent is introduced into the reaction zone in a proportion of between about 10 to 45 parts per part of pentane.
10. A process according to claim 5 wherein the withdrawn product is separated into a hexachlorocyclopentadiene fraction and an octachlorocyclopentene fraction, and wherein the octachlorocyclopentene fraction is recycled to the reaction zone.
11. A process according to claim 5 wherein the solid contact material comprises diatomaceous silica.
12. A process according to claim 5 wherein the solid contact material comprises silica gel.

13. A process according to claim 5 wherein the solid contact material comprises graphite.

14. A process according to claim 5 wherein said solid contact material has a surface area of between about 1 and 50 m.²/g.

15. A process according to claim 5 wherein both the fore and the hind portion of the reaction zone are packed.

16. A one-step process for making hexachlorocyclopentadiene from a reaction mixture containing pentane and chlorine, which process comprises:

maintaining an elongated reaction zone essentially adiabatically at a reaction temperature within predetermined limits between about 375° C. and not more than about 400° C., said zone having an inlet end and an outlet and being packed with a fixed bed of particulate diatomaceous silica in at least about the hind two-thirds of its length and being unobstructed in not more than about the first third of its length such that the residence time of the reaction mixture in any such unobstructed portion is less than 5 seconds;

introducing into said reaction zone at its inlet end (a) a pentane in liquid form having a straight carbon chain of at least four carbon atoms, (b) free chlorine in a proportion equal to between about 103% and 110% of the theoretical amount of chlorine required to convert said pentane to hexachlorocyclopentadiene, and (c) as the means for maintaining the reaction temperature in the reaction zone within the predetermined limits, a perchlorinated hydrocarbon of from 1 to 5 carbon atoms in liquid form capable of vaporizing at the temperature and pressure prevailing in said reaction zone, said liquid perchlorinated hydrocarbon being introduced into the reaction zone in a proportion which maintains a maximum temperature of not more than about 400° C. therein;

passing the resulting reaction mixture in vapor phase through said zone at a pressure between about 0 and 25 p.s.i.g. at a rate resulting in a superficial residence time of between about 5 and 25 seconds and sufficient to result in a feed conversion of at least 85%;

withdrawing the resulting crude reaction product from the reaction zone;

separating the withdrawn crude product into a hexachlorocyclopentadiene fraction and an octachlorocyclopentene fraction;

and recovering hexachlorocyclopentadiene.

17. A process according to claim 16 wherein about 15 to 45 parts of carbon tetrachloride per part of pentane are introduced into said reaction zone as the principal diluent and wherein octachlorocyclopentene separated from the crude product is recycled to the reaction zone.

References Cited

UNITED STATES PATENTS 2,650,942 9/1953 Maude.
1,974,491 2/1934 Reilly.

FOREIGN PATENTS 906,262 5/1961 Great Britain.
562,319 8/1958 Canada.

LEON ZITVER, Primary Examiner

MATTHEW M. JACOB, Assistant Examiner

U.S. Cl. X.R.

260—650, 654, 655, 662